(12) United States Patent
Knapp

(10) Patent No.: US 8,899,491 B2
(45) Date of Patent: Dec. 2, 2014

(54) THERMOSTATIC MIXER DEVICE

(75) Inventor: Francesco Knapp, Cava Manara (IT)

(73) Assignee: Studio Tecnico Sviluppo e Ricerche S.T.S.R. S.R.L., Zingonia (IT)

( * ) Notice: Subject to any disclaimer, the term of this patent is extended or adjusted under 35 U.S.C. 154(b) by 830 days.

(21) Appl. No.: 13/063,073

(22) PCT Filed: Sep. 7, 2009

(86) PCT No.: PCT/EP2009/006481
§ 371 (c)(1),
(2), (4) Date: Mar. 9, 2011

(87) PCT Pub. No.: WO2010/028790
PCT Pub. Date: Mar. 18, 2010

(65) Prior Publication Data
US 2011/0168790 A1 Jul. 14, 2011

(30) Foreign Application Priority Data
Sep. 10, 2008 (IT) .................................. 2008A0666

(51) Int. Cl.
*G05D 23/185* (2006.01)
*G05D 23/13* (2006.01)

(52) U.S. Cl.
CPC .................................. *G05D 23/1353* (2013.01)
USPC ..................... 236/12.11; 236/12.2; 236/99 R; 236/100

(58) Field of Classification Search
USPC ................ 236/12.2, 12.11, 12.12, 99 R, 100; 137/625.41
See application file for complete search history.

(56) References Cited

U.S. PATENT DOCUMENTS

| 5,779,139 | A  | * | 7/1998 | Ueno | ........................... 236/12.2 |
| 6,325,295 | B1 |   | 12/2001 | Lorch | |
| 6,454,175 | B1 | * | 9/2002 | Lorch | ........................... 236/12.2 |

(Continued)

FOREIGN PATENT DOCUMENTS

| DE | 29915433 U1 | 12/1999 |
| EP | 1241385 A1 | 9/2002 |
| WO | 96/16362 A1 | 5/1996 |
| WO | 97/01807 A1 | 1/1997 |

OTHER PUBLICATIONS

International Search Report, dated Jun. 2, 2010, from corresponding PCT application.

*Primary Examiner* — Marc Norman
(74) *Attorney, Agent, or Firm* — Young & Thompson

(57) ABSTRACT

A thermostatic mixer device for sanitary appliances, includes: a cartridge envelope; a distributor bottom member with intake openings for cold and hot water, a delivery opening for mixed water, and elements for controlling and intercepting the delivered flow rate; a mixing member located inside the envelope, forming a cylinder, control openings and passageways for directing hot water and cold water from the intake openings to the respective control openings; a distribution slide valve, sealingly sliding in the axial direction within the cylinder of the mixing member, and cooperating with the control openings in order to partially shut the control openings in opposite senses; a thermometric element for displacing the distributing slide valve against the action of a return spring; and control elements for establishing the temperature desired for the delivered mixed water. The envelope and mixing member form, in a single piece, a sole containment and mixing member which, with its outer portions, forms the envelope containing the mixer device, with its inner portions forms the cylinder cooperating with the distribution slide valve and the control openings, and by cooperation of the outer and inner portions determines the passageways.

4 Claims, 2 Drawing Sheets

(56) References Cited

U.S. PATENT DOCUMENTS

| | | | |
|---|---|---|---|
| 6,557,770 B2* | 5/2003 | Mace et al. | 236/12.1 |
| 7,850,088 B2* | 12/2010 | Wei et al. | 236/12.1 |
| 2002/0130189 A1 | 9/2002 | Mace et al. | |
| 2003/0197065 A1* | 10/2003 | Graves | 236/12.2 |
| 2003/0234295 A1* | 12/2003 | Mace et al. | 236/12.2 |
| 2004/0011879 A1* | 1/2004 | Lorch | 236/12.1 |
| 2005/0067499 A1* | 3/2005 | Goedde | 236/12.11 |
| 2006/0124758 A1* | 6/2006 | Sansum et al. | 236/12.11 |
| 2007/0029395 A1* | 2/2007 | Scott | 236/12.2 |
| 2007/0152075 A1* | 7/2007 | Ruga et al. | 236/12.2 |
| 2008/0035744 A1* | 2/2008 | Mace et al. | 236/12.2 |
| 2008/0093470 A1* | 4/2008 | Qingjun | 236/12.16 |
| 2009/0308939 A1* | 12/2009 | Li et al. | 236/12.2 |

* cited by examiner

THERMOSTATIC MIXER DEVICE

FIELD OF THE INVENTION

The subject of this invention is a thermostatic mixer device of the type including: a cartridge envelope shaped as a skirt; a distributor bottom member with intake openings for cold water and hot water, with a delivery opening for mixed water having a controlled temperature, and with means for controlling and intercepting the delivered flow rate; a mixing member located inside the envelope, forming a cylinder, control openings and passageways for directing the hot water and the cold water from said intake openings of the distributor bottom member to the respective control openings; a distribution slide valve, sealingly sliding in the axial direction within said cylinder of the mixing member, and cooperating with said control openings in order to partially closing the control openings in opposite senses; a thermometric element of the expansion type, provided for displacing said distributing slide valve against the action of a return spring accordingly to the temperature taken by the mixed water; and control means for establishing the temperature desired for the mixed water.

BACKGROUND OF THE INVENTION

In the known embodiments of these types of thermostatic mixer devices, said mixing member located inside the envelope forms a member separated from the envelope shaped as a skirt. As a consequence it is needed to separately manufacture these two members and to assemble the same before they are connected to the other component parts of the mixer device. Therefore, this structure involves complications in manufacturing and assembling the device, which have a negative influence both on the manufacturing costs and on the organization of the production.

SUMMARY OF THE INVENTION

The main object of this invention is to improve a thermostatic mixer device of the referred type, by simplifying in an important manner the manufacture and assemblage thereof, in order to reduce the manufacture costs and to allow better organizing the production.

This object is attained, according to this invention, by the fact that said skirt envelope of the mixer device and said inner mixing member form, in a single piece, a sole containment and mixing member which, with its outer portions, forms the envelope containing the mixer device, with its inner portions forms said cylinder cooperating with the distribution slide valve and said control openings, and by the cooperation of the outer portions and the inner portions determines said passageways for directing the cold water and the hot water from said intake openings of the distributor bottom member to said control openings of the mixing member.

Thanks to these features, the assemblage of the mixer device is very simplified, because the different component parts or component groups require only to be assembled with said sole containment and mixing member. On its turn, of course, the manufacture of said sole containment and mixing member, which as a rule is made of formed plastic material, involves providing a particularly complex mould, but this burden is then largely counterbalanced by the presence of a single member serving both for the containment and for the mixing operation, instead of two separate members, and by the important simplifications attained in the assemblage process.

The mixer device according to the invention is preferably embodied as a cartridge intended to be inserted into a mixing body or a mixing group. However, by choosing a suitable outer shaping and possibly making suitable modifications, the mixing device can also be embodied as a proper hydraulic appliance.

Said inner portion of the sole containment and mixing member, forming said cylinder, is extended by a cylindrical wall up to said distributor bottom member.

It is of advantage that said sole containing and mixing member is connected at the underside to a distributor bottom member for support and connection, intended to be applied to a manifold for supplying cold and hot water and for delivering mixed water, and including a fixed part and a movable part, both carrying hard material plates having profiled openings for controlling and intercepting the flow rate.

An element having a joint for a maneuver member is made solid with the sole containment and mixing member by means of a ring nut screwed onto a top threaded portion of the envelope, in order to drive the rotation of the sole containment and mixing member for controlling and intercepting the flow rate.

Within the element having a joint for a maneuver member are mounted the control means for establishing the temperature of the delivered mixed water, which include a rotatable element having a joint for a control member, screwed with an axially displaceable element that, through a security spring, transmits a displacement to a piston of the thermometric element.

It is of advantage that the whole conformation of the inner cavity of the sole containment and mixing member is determined by a sole die punch tool entering from an end of the member, whereas the passageways for the water are determined by die punch tools entering from the opposite end of the member, and the control openings result from a contact, substantially without clearance, among said die punch tools entering from the opposite ends of said member.

BRIEF DESCRIPTION OF THE DRAWINGS

These and other features, objects and advantages of the subject of this invention will appear more clearly from the following description of an embodiment, which has the character of a non-limiting example, with reference to the appended drawings, wherein.

DESCRIPTION OF THE PREFERRED EMBODIMENT

Figure 3:
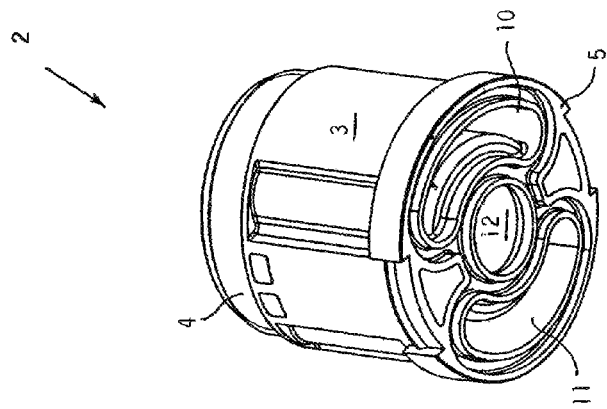
FIG. 3 shows an outer perspective view of the sole containment and mixer member being the more characteristic part of the invention.
Figure 1:
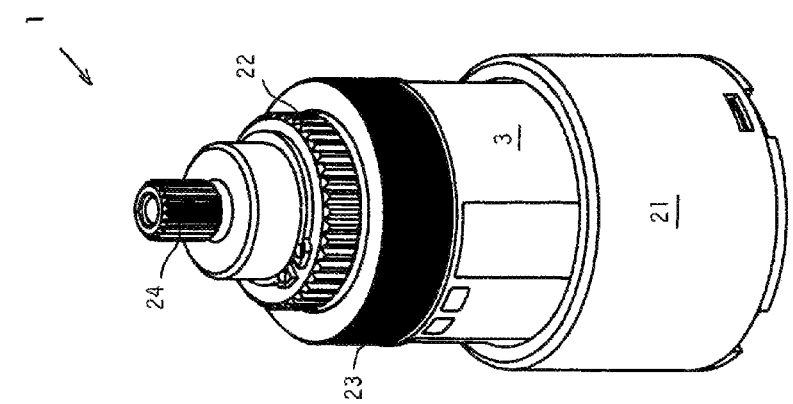
FIG. 1 shows an outer perspective view of a mixer device according to the invention, embodied as a cartridge.
Figure 2:
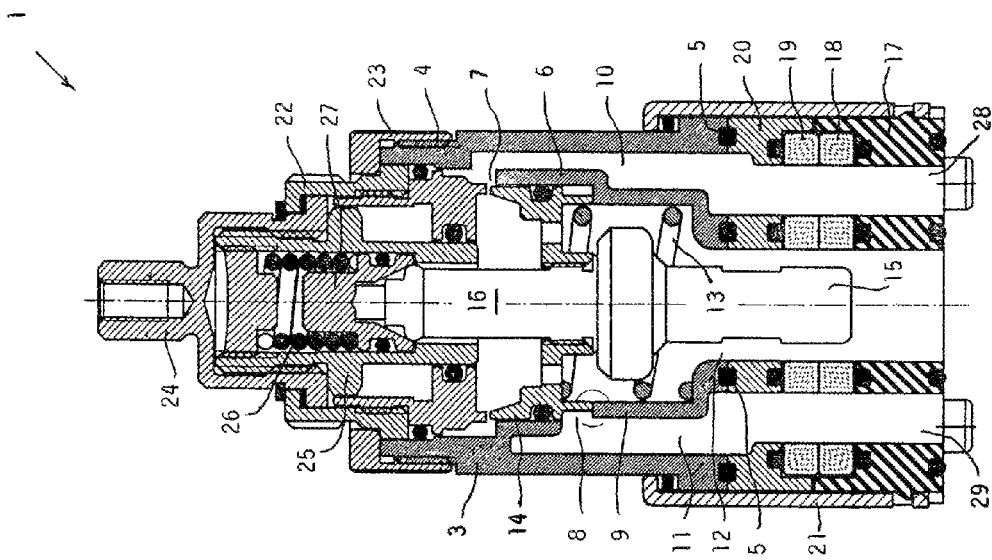
FIG. 2 shows an axial section of the mixer device according to FIG. 1.

With reference to FIGS. 1 and 2, the thermostatic mixing device, designed in its whole by reference 1, is represented in the shape of a cartridge and includes a sole containment and mixing member designed in its whole by reference 2. The sole containment and mixing member 2 forms, with an outer portion 3, the envelope shaped as a skirt which contains the cartridge. In the following will be considered as upper and lower, respectively, the component parts of the mixer device which have the corresponding positions in FIGS. 1, 2 and 5, but of course the mixer device, when installed, can take any position. Said envelope 3 has at its upper end a threaded portion 4 for fixing the means controlling the temperature, and the sole containment and mixing member 2 has at its lower end sealing means 5 for its connection to a distributor bottom member.

The sole containment and mixing member 2 forms, with an inner portion thereof, a cylinder 6 intended to cooperate with a distribution slide valve. Cylinder 6 defines, at its upper end, a control opening 7 for the cold water and, at its lower end, a control opening 8 for hot water.

The inner portion of the sole containment and mixing member 2 forming the cylinder 6 is extended downwards by forming a cylindrical wall 9 ending at bottom with the sealing means 5 for connection to the distributor bottom member, and delimiting a passageway 12 for delivery of mixed water.

Between the outer portion 3 of the sole containment and mixing member 2 and the inner portions 6 and 7 thereof there are defined two passageways 10 and 11 for cold water and hot water, and these passageways communicate at the upper ends thereof with the control openings 7 and 8, respectively, whereas these passageways end at their lower ends in the sealing means 5 for connection to the distributor bottom member.

Within cylinder 6 is housed, sealingly sliding along the axial direction, a distribution slide valve 14 which is suitable for cooperating with said control openings 7 and 8 in order to partially shutting the same in opposite senses as a function of the position taken by the distribution slide valve in cylinder 6. A return spring 13 pushes permanently the distribution slide valve 14 towards the position in which it shuts the control opening 7 for cold water. To the distribution slide valve 14 is fixed an expansion thermometric element 15 which is immersed in the passageway 12 for mixed water. Therefore, in operation, the thermometric element always takes the temperature of the mixed water delivered by the thermostatic mixer device, and it dilates in a manner corresponding to said temperature. The thermometric element 15 is extended at its upper end by a piston 16 resting against the control means provided for setting up the temperature desired for the delivered mixed water. Therefore the thermometric element 15, by its dilatation, displaces downwards the distributor slide valve 14, by releasing in part the control opening 7 for cold water and shutting in part the control opening 8 for hot water. This is the process, per se well known for example by the international patent application WO 96/16362, by which a thermostatic mixer device determines and maintains the temperature of the delivered mixed water.

The sole containment and mixing member 2 is connected at the lower end to a distributor bottom member for support and connection, which is intended to be applied to a connection manifold for feed of cold and hot water and for delivery of mixed water. The distributor bottom member includes a fixed component part 17 intended to be applied to the feeding manifold (not represented) and a movable component part 20 connected, through the sealing means 5, to the sole containment and mixing member 2 and therefore to the skirt shaped envelope 3. Both component parts 17 and 20 of the distributor bottom member are mutually connected in rotatable manner by a tubular member 21. The fixed component part 17 of the distributor bottom member houses a fixed plate 18 of hard material, and the movable component part 20 of the distributor bottom member houses a movable plate 19 of hard material. The fixed plate 18 and the movable plate 19 are provided with shaped openings which allow regulating the flow rate of the water entering the mixer device, and therefore the flow rate of delivered mixed water, by rotating the sole containment and mixing member 2 and, solid therewith, the movable component part 20 of the distributor bottom member. Said plates also allow intercepting the water feed. Such a device is per se well known for example through the international patent application WO 97/01807, and therefore it will not be described in detail. In FIG. 1, the distributor bottom member is represented in the position in which the openings of plates 18 and 19 allow the maximum feed of cold and hot water. As it may observed in FIG. 1, in this position the passageways 10, 11 and 12 of the sole containment and mixing member 2 are extended by corresponding passageways of the distributor bottom member 17-20 and of the plates 18 and 19, up to intake openings 28 and 29 and to the feeding manifold.

In order to rotate the sole containment and mixing member 2 for the control of the flow rate, an element 22 having a connection for a maneuver member is solid with the sole containment and mixing member 2 through a tubular member 23 screwed on the upper threaded portion 4 of the skirt shaped envelope 3. Within the element 22 are housed the control means intended for regulating the temperature of the delivered mixed water. These means comprise a rotatable element 24 which has a connection for a maneuver member and is screwed with an axially displaceable element 25 which, through a security spring 26, transmits a displacement to a rest element 27 against which rests the piston 16 of the thermometric element 15. Also this control device is per se well known, for example through the international patent application WO 96/16362, and therefore it will not be described in detail.

Figure 6:
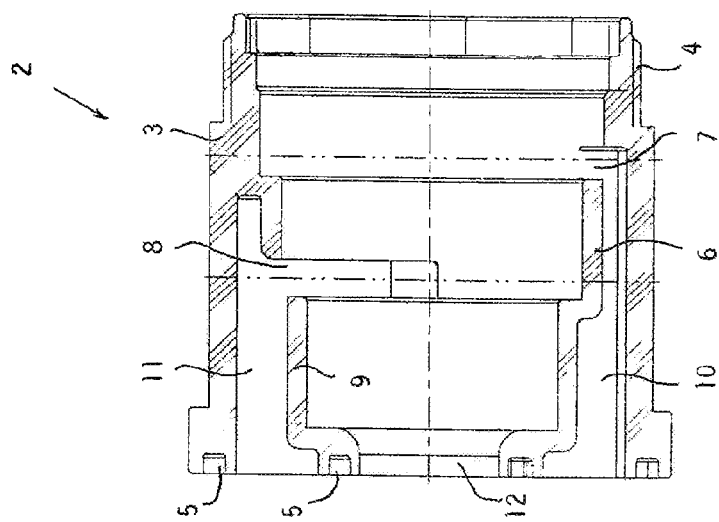
FIG. 6 shows a cross section of the sole containment and mixer member, taken along line VI-VI of FIG. 4.
Figure 4:
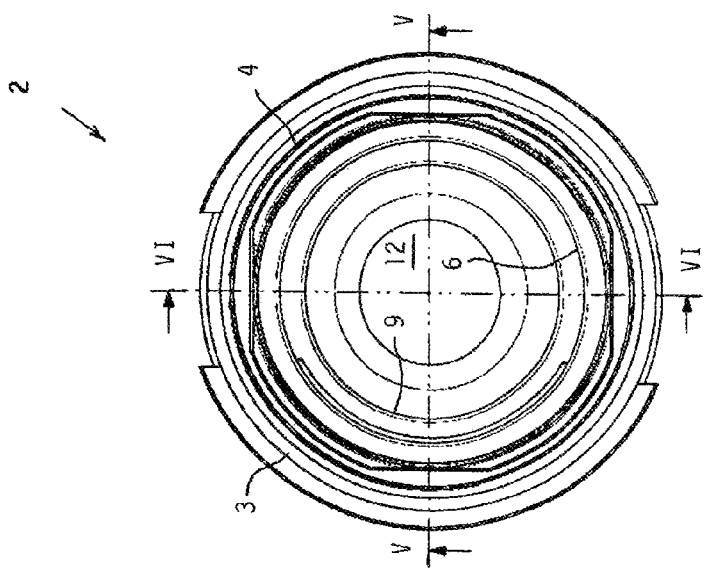
FIG. 4 shows an axial view of the sole containment and mixer member, seen from the side intended to receive the means for regulation of the temperature.
Figure 5:
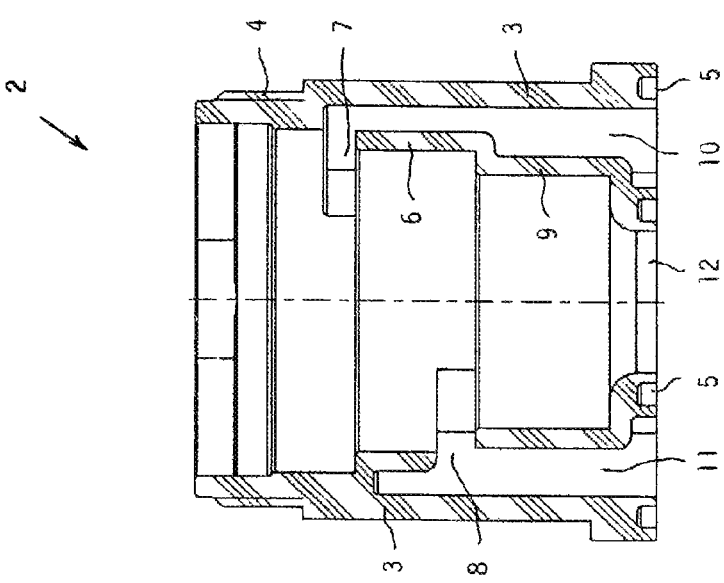
FIG. 5 shows a cross section of the sole containment and mixer member, taken along line V-V of FIG. 4.

It will be remarked from FIGS. 5 and 6 that the whole shape of the inner cavity of the sole containment and mixing member 2 can be defined by a single die punch tool entering from above according to FIG. 5 and entering from the right according to FIG. 6, whereas the passageways 10 and 11 can be determined by die punch tools entering from bottom according to FIG. 5 and entering from the left according to FIG. 6; the control openings 7 and 8 result from a contact, substantially without clearance, among said die punch tool entering from above and the die punch tools entering from bottom according to FIG. 5. Therefore, the complex structure of the sole containment and mixing member 2 can be provided by means of precise molds which, however, have a relatively modest complexity.

According to the invention there has been provided a thermostatic mixer device which, without in any way compromising its operation, allows to simplify the manufacture and the assemblage of its component parts and therefore, finally, to support its economicity.

In the represented exemplary embodiment the thermostatic mixer device has been represented in the shape of a cartridge, however, as already told, the envelope can also be shaped and, if needed, modified, so as to form the body of a mixer device of a kind not using a cartridge.

It is to be understood that the invention is not limited to the embodiment described and illustrated by way of example. Several possible modifications have been mentioned in the course of the description, and others are within the reach of those skilled in the art. These and other modifications and any replacement by technically equivalent means may be applied to what has been described and illustrated, without departing from the spirit of the invention and the scope of this Patent as defined by the appended claims.

The invention claimed is:

1. A thermostatic mixer device (1) comprising:

a cartridge envelope (3) shaped as a skirt;

a distributor bottom member (17,20) with intake openings for cold water and hot water and with a delivery opening for mixed water having a controlled temperature;

means (18,19) for controlling and intercepting a delivered flow rate;

a mixing member located inside the envelope (3), forming a cylinder (6), control openings (7,8) and passageways (10,11) for directing the hot water and the cold water from said intake openings of the distributor bottom member (17,20) to respective ones of the control openings (7,8);

a distribution slide valve (14), sealingly sliding in an axial direction of the device within said cylinder (6) of the mixing member, and cooperating with said control openings (7,8) in order to partially close the control openings in opposite senses;

an expansion type thermometric element (15,16) that displaces said distribution slide valve (14) against the action of a return spring (13) based on a temperature of the mixed water; and control means (24,25,26,27) for establishing a desired temperature for the mixed water, wherein said envelope (3) and said mixing member (6) form, as a single piece, a sole containment and mixing member (2), outer portions of said containment and mixing member formed by the envelope, and an inner portion of said containment and mixing member formed by said cylinder cooperating with the distribution slide valve (14) and the control openings (7,8), whereby the outer portions and the inner portion cooperate to determine said passageways (10,11) for directing the cold water and the hot water from said intake openings of the distributor bottom member (17,20) to said control openings (7,8), wherein an underside of said containing and mixing member (2) is connected to a distributor bottom member (17,20) for support and connection, adapted to be applied to a manifold for supplying cold and hot water and for delivering mixed water, said distributor bottom member including a fixed part (17) and a movable part (20) that both carry plates (18,19) with profiled openings for controlling and intercepting the flow rate, and wherein an element (22), having a joint for a maneuver member, is made solid with the containment and mixing member (2) by means of a ring nut (23) screwed onto a top threaded portion (4) of the envelope (3) that drives, in rotation, the containment and mixing member (2) for controlling and intercepting the flow rate.

2. The thermostatic mixer device (1) as set forth in claim 1, wherein said inner portion of the containment and mixing member (2) is extended by a cylindrical wall (9) up to said distribution bottom member (17,20).

3. The thermostatic mixer device (1) as set forth in claim 1, wherein the control means (24,25,26,27) for establishing the desired temperature of the delivered mixed water are mounted within the element (22) having a joint for a maneuver member, the control means including a rotatable element (24), having a joint for a control member, screwed with an axially displaceable element (25) that, through a security spring (26), transmits a displacement to a piston (16) of the thermometric element (15).

4. The thermostatic mixer device (1) as set forth in claim 1, wherein a whole conformation of an inner cavity of the containment and mixing member (2) is determined by a sole die punch tool entering from an end of the containment and mixing member (2), whereas the passageways (10,11,12) are determined by die punch tools entering from the opposite end of the containment and mixing member (2), and the control openings (7,8) result from a contact, substantially without clearance, among said die punch tools entering from opposite ends of the member (2).

* * * * *